(12) United States Patent
Geissler

(10) Patent No.: US 9,915,341 B2
(45) Date of Patent: Mar. 13, 2018

(54) GEARED DRIVE ASSEMBLIES

(71) Applicant: Michael Paul Alexander Geissler, London (GB)

(72) Inventor: Michael Paul Alexander Geissler, London (GB)

( * ) Notice: Subject to any disclaimer, the term of this patent is extended or adjusted under 35 U.S.C. 154(b) by 0 days.

(21) Appl. No.: 14/894,863

(22) PCT Filed: Apr. 1, 2014

(86) PCT No.: PCT/GB2014/051027
§ 371 (c)(1),
(2) Date: Nov. 30, 2015

(87) PCT Pub. No.: WO2014/162127
PCT Pub. Date: Oct. 9, 2014

(65) Prior Publication Data
US 2016/0116056 A1    Apr. 28, 2016

(30) Foreign Application Priority Data
Apr. 1, 2013  (GB) ................................... 1305878.9

(51) Int. Cl.
*F16M 13/00*        (2006.01)
*F16H 57/12*        (2006.01)
(Continued)

(52) U.S. Cl.
CPC ............. *F16H 57/12* (2013.01); *F16M 11/06* (2013.01); *G03B 17/561* (2013.01); *F16H 2057/121* (2013.01); *F16H 2057/126* (2013.01)

(58) Field of Classification Search
CPC ...... B64C 25/405; F16H 57/12; Y02T 50/823
See application file for complete search history.

(56) References Cited

U.S. PATENT DOCUMENTS

| 3,397,589 A | 8/1968 | Moore | |
|---|---|---|---|
| 6,357,313 B1 * | 3/2002 | Appleyard | B62D 5/0409 384/255 |
| 6,655,273 B2 * | 12/2003 | Bitterich | B41F 13/012 101/182 |

FOREIGN PATENT DOCUMENTS

| EP | 0 426 859 A1 | 5/1991 |
|---|---|---|
| ES | 2 014 819 A6 | 7/1990 |
| JP | 63-23064 A | 1/1988 |

OTHER PUBLICATIONS

International Search Report for PCT/GB2014/051027 dated Aug. 20, 2014.

* cited by examiner

*Primary Examiner* — Amy J. Sterling
(74) *Attorney, Agent, or Firm* — TannerIP PLLC; Daniel A. Tanner, III; James E. Golladay, II

(57) ABSTRACT

A geared drive assembly (10) comprising the driven gear (12) arranged to mesh with the driving gear (14) and a rotary actuator operatively connected to the driving gear (14) by the pulley belt (22) engaging with an first pulley wheel (18) of the rotary actuator and a second pulley wheel (24) rigidly and coaxially connected to the driving gear (14), wherein the pulley belt (22) comprises first (26) and second (28) pulley belt portions extending between the first (18) and second (24) pulley wheels, wherein the first pulley belt portion (26) is maintained, in use, under tension, and wherein the second pulley belt portion (28) is slack, in use. Advantages of the invention, compared with known anti-backlash gearboxes, include: significant weight reductions, reduced complexity, reduced drag, smaller motor sizes, reduced part count, reduced play and backlash. Embodiments of the invention may advantageously provide a lightweight, simple anti-
(Continued)

backlash gearing assembly that are particularly suited for use in motorized camera mounts, e.g. pan/tilt heads.

21 Claims, 5 Drawing Sheets

(51) Int. Cl.
*F16M 11/06* (2006.01)
*G03B 17/56* (2006.01)

GEARED DRIVE ASSEMBLIES

This invention relates to drive assemblies, and in particular, but without limitation, to geared, motorised drives.

In many situations, it is necessary to provide a geared drive arrangement between a rotary actuator, such as an electric motor, and an output. This can be achieved, in many situations, by direct gearing, a pulley system or a combination of the two, to obtain a desired gearing ratio between the actuator and output.

In order to obtain fine control of the output, it is often necessary to use a high gear ratio, which often requires the use of small pinion gears meshing with larger crown gears. Up to an extent, direct gearing provides a practical solution, but beyond certain limits, problems such as slippage, play and backlash can become apparent. Backlash, slippage and play in a fine-control gearing system is generally undesirable because it can introduce uncertainty and can lead to unpredictable outputs for given inputs.

Backlash is a common problem in geared drives, whereby there can be a tendency for the surfaces of the meshing teeth to slip or play relative to one another, thus introducing play. Excessive paly manifests itself as generally undesirable backlash in particular when the driving direction is reversed.

This is shown in particular, with reference to FIG. 5 of the drawings, which shows a known gearing arrangement whereby a driven gear 12 meshes with a pair of driving gears 14, 30. The shape of the teeth of the respective gears is curved to as to allow the gear teeth to roll with respect to one another. It can be seen in FIG. 5 that to achieve frictionless or low friction meshing of the gear teeth, a small gap 190 is required between the teeth to allow their respective surfaces to clear one another as the teeth move into and out of engagement. This small gap 190 is sufficient to create backlash or play in the system, especially during a reversal of the driving direction, in which case, the respective teeth will disengage (as shown in FIG. 5) before opposite tooth surfaces engage as the gears begin to rotate in the opposite direction.

The known solution to the problem of backlash in geared systems is to move the centres 192, 194 of the gears close to one another to close the gap 190 slightly: the smaller the gap, the less backlash during reversal of direction. However, if the gear centres 192, 194 are moved together to close the gap 190 entirely, that is to say, to eliminate any play in the system, it will be appreciated that both sides of a tooth of one of the gears will engage opposite faces of the valley of the other gear (the valley being the space between the teeth). Therefore, whilst moving the gear centres 192, 194 closer together can eliminate backlash, it also causes the teeth of one gear to jam into the valley of the other gear thereby locking the gears together. On the other hand, if the gap 190 is opened up slightly, a high-friction, but nevertheless unlocked arrangement can be obtained, although the gap 190 re-introduces backlash. As such, there is a competing requirement between the inter-gear spacing 190 being as small as possible to reduce backlash and it being larger to free-up the system and allow the gears to mesh freely.

The invention aims to provide a solution to one or more of the above problems.

According to a first aspect of the invention, there is provided a geared drive assembly in which the teeth of a driving gear are maintained in contact with the teeth of a driven gear with which, in use, it meshes by a pulley arrangement operatively connected to the driving gear and being arranged such that part of a pulley belt of the pulley arrangement is tensioned so as to bias the said teeth into engagement, whilst a different part of the pulley belt is substantially slack so as not to disengage the said teeth, in use.

According to a second aspect of the invention, there is provided a geared drive assembly comprising a driven gear arranged to mesh with a driving gear and a rotary actuator operatively connected to the driving gear, a pulley belt engaging with a first pulley wheel and a second pulley wheel rigidly and coaxially connected to the driving gear, wherein the pulley belt comprises a first and second pulley belt portions extending between the first and second pulley wheels, wherein the first pulley belt portion is maintained, in use, under tension, and wherein the second pulley belt portion is slack, in use.

Suitably, the first pulley wheel is operatively connected to the rotary actuator and the driving gear is driven by the pulley belt.

According to a third aspect of the invention, there is provided a geared drive assembly comprising a driven gear arranged to mesh with a driving gear and a rotary actuator operatively connected to the driving gear by a pulley belt engaging with a first pulley wheel of the rotary actuator and a second pulley wheel rigidly and coaxially connected to the driving gear, wherein the pulley belt comprises a first and second pulley belt portions extending between the first and second pulley wheels, wherein the first pulley belt portion is maintained, in use, under tension, and wherein the second pulley belt portion is slack, in use.

A fourth aspect of the invention provides a camera mount assembly comprising a motorised mechanism for adjusting the orientation, in use, of a camera affixed to the camera mount assembly, the motorised mechanism comprising a geared drive assembly as set forth herein.

Such a configuration, that is to say, the tension in the first pulley belt portion, ensures that the teeth of the driving and driven gears are maintained in contact by biasing their respective teeth into engagement, at all times, in use. This suitably reduces play in the drive assembly.

This is illustrated schematically in FIG. 6 of the drawings whereby pulley belt 22 is employed to bias the driving gears 14, 30 in opposite directions. The pulley belt 22 of FIG. 6 illustrates how, by biasing the driving gears 14, 30 in opposite directions, their respective teeth 200, 210 can be brought into mating contact with the teeth 206, 214 of the driven gear 12.

Specifically, in FIG. 6, the right-hand side 198 of one of the teeth 200 of the first driving gear 14 is pulled into contact with the left-hand side 204 of the corresponding tooth 206 of the driven gear 12. Likewise, the left-hand side 208 of one of the teeth 210 of the second driving gear 30 is pulled into contact with the right-hand side 212 of another one of the teeth 214 of the driven gear 12. Thus, whilst there is still a gap 190 between the respective teeth of the respective gears (on the opposite side of the teeth 200, 210 to the ideal mating line 215), thus allowing the teeth to mesh at an ideal mating line 215 to minimise friction, any backlash in the system is reduced or eliminated by ensuring that the first 14 and second 30 driving gears are maintained, at all times, in meshing contact with the driven gear 12.

In the example of FIG. 6, the driving gears 14, 30 are configured to drive the driven gears in opposite directions, but, as shall become clear from the following, a single rotary actuator may be used and still achieve the same effect by way of a tensioning pulley belt.

Suitably, the geared drive assembly additionally comprises a second driving gear that meshes with the driven gear. Suitably, the first and second driving gears are configured, in use, to drive the driven gear in opposite directions.

In a first possible embodiment of the invention, a single pulley belt is suitably used to interconnect both driving gears with the first pulley wheel via the second, and a third, pulley wheel each being rigidly and coaxially connected to the driving, and second driving, gears respectively. Suitably, the pulley belt in such a situation comprises three pulley belt portions, namely: a first pulley belt portion extending between the first and second pulley wheels that is tensioned; a second pulley belt portion that is substantially and/or relatively slack, in use; and a third pulley belt portion extending between the first and third pulley wheels that is tensioned. The rotary actuator may be bi-directional.

In a second possible embodiment of the invention, a pair of pulley belts may be used. In such a situation, a first one of the pulley belts is used to interconnect first and second pulley wheels, as previously described. A second rotary actuator and pulley belt may thus be employed to drive the second driving gear, in which case the second pulley belt at least partially encircles a fourth pulley wheel of the second rotary actuator and the third pulley wheel. In this configuration, each pulley belt has a tensioned and a relatively slack portion, which are oppositely arranged so that the first rotary actuator, pulley belt and pair of pulley wheels can be used for driving the driven gear in one direction, and the second rotary actuator, pulley belt and pair of pulley wheels can be used for driving the driven gear in the opposite direction, The rotary actuators, in such a configuration, are suitably unidirectional.

The geared drive assembly comprises a driven gear arranged to mesh with a driving gear. The gears therefore comprise intermeshing teeth, which may be of any suitable configuration, although it is preferred to that they be part-helical, inclined or cross-axial gears to maximise their contact areas to facilitate transmission of forces from one gear to the other.

The rotary actuator suitably comprises an electric motor, and optionally, a gearbox. The motor may comprise a stepper motor.

The pulley belt suitably comprises a toothed pulley belt to minimise slippage of the belt relative to the pulley wheels. The pulley wheels suitably comprise teeth that are complimentary to those of the pulley belt. A pulley belt portion can be tensioned, in certain embodiments, by rotationally displacing one of the drive gears relative to the driven gear.

The driven gear suitably comprises an annular gear having a through hole through which hole, in use, cables and the like, can pass.

The invention may be particularly suitable for use in fine motor control situations, such as in the pan/tilt heads of camera support and manipulation devices, especially where backlash and play need to be minimised. A conventional motorised camera "pan/tilt head" typically comprises a heavy, complicated and expensive gearbox that is designed to minimise play and backlash. Such gearboxes impart a lot of drag, meaning that the motor needs to be over-sized relative to the output loads, which increases manufacturing cost, complexity and operating costs. A heavy motor and/or gearbox is undesirable, in particular with moving camera set-ups, where weight and inertia play a big role, such as in boom-mounted, overhead track-mounted, and hand-held cameras.

Possible advantages of the invention, compared with known anti-backlash gearboxes, include: significant weight reductions, reduced complexity, reduced drag, smaller motor sizes, reduced part count, reduced play and backlash. Thus, embodiments of the invention may advantageously provide a lightweight, simple anti-backlash gearing assembly that can be used in camera mounting situations.

Preferred embodiments of the invention shall now be described, by way of example, with reference to the accompanying drawings in which.

Figure 1:
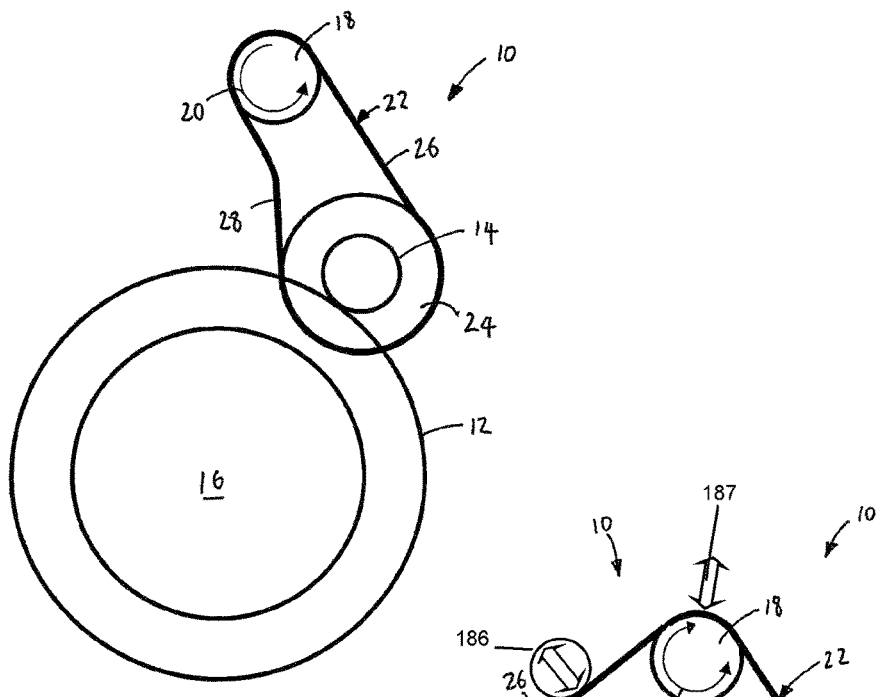
FIG. 1 is a schematic diagram of a first embodiment of a drive assembly in accordance with the invention.

In FIG. 1, a drive assembly 10 comprises an annular driven gear 12 whose teeth (not shown) intermesh with the teeth (not shown) of a driving gear (14). The outer radius of the driven gear 12 is much greater than that of the driving gear 14 giving rise to a large gear ratio between the two. The driven gear 12 is annular, having a large central opening 16 through which cables and the like (not shown), can pass, in use. The central hole 16 also reduces the weight of the gear assembly 10 by removing a lot of unnecessary material. The gears 12, 14 can be mounted for rotation about their respective axes on shafts, on or in tubes, or casements (not shown).

The driving gear 14 is driven for rotation by a rotary actuator, such as an electric motor and gearbox assembly (not shown). The rotary actuator is arranged to rotate a first toothed pulley wheel 18 in the direction as indicated by arrow 20. A first, substantially inextensible, toothed pulley belt 22 engages the first pulley wheel 18 and a second toothed pulley wheel 24, which is rigidly and coaxially connected to the driving gear 14. The pulley belt 22 has a first tensioned portion 26 and a second slack portion 28, which serves to maintain the teeth of the driving 14 and driven 12 gears in constant contact, thereby reducing and/or eliminating play and/or backlash.

Figure 2:
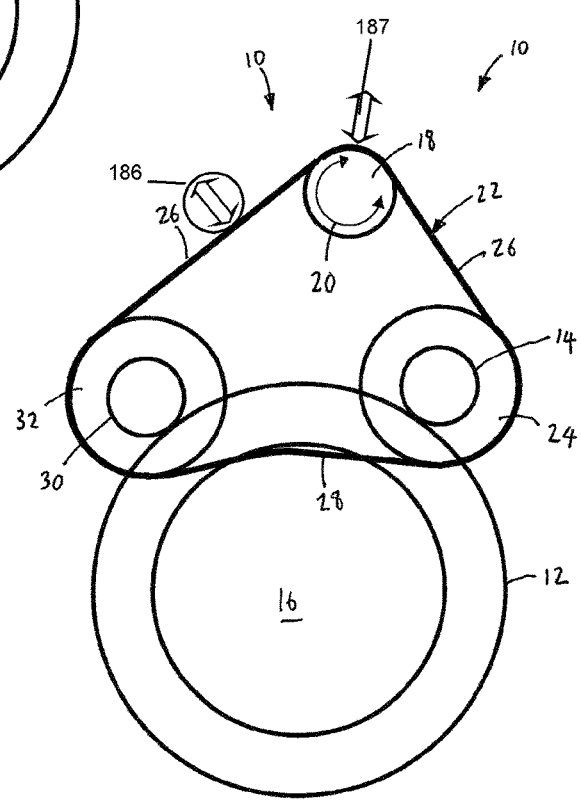
FIG. 2 is a schematic diagram of a second embodiment of a drive assembly in accordance with the invention.

In FIG. 2, a second embodiment of a drive assembly 10 comprises a similar arrangement to that shown in FIG. 1, and identical reference signs have been used to identify identical features to avoid repetition.

In FIG. 2, a second driving gear 30 has been added, whose teeth (not shown) mesh with those of the annular driven gear 12. The second driving gear 30 is coaxially and rigidly affixed to a third toothed pulley wheel 32 in the same manner as the second toothed pulley wheel 14, 24.

This time, the pulley belt 22 extends around all three toothed pulley wheels 18, 24, 32 and comprises two tensioned portions 26 (extending between each the first and third pulley wheels 24, 32 and the first pulley wheel 18) and one slack portion 28 (extending between the first and third pulley wheels 24, 30). This configuration is arrived at by wrapping the pulley belt 22 around all three pulley wheels 18, 24, 32) and by rotating the second 24 and third 32 pulley wheels in opposite directions to tension both portions 26 of the pulley belt 22 as shown. The tension can then be "locked in", by bringing the driving gears 14, 30 into meshing engagement with the driven gear 12 and releasing them to allow the tension in the pulley belt 22 to pull the teeth of the three gears 12, 14, 30 into constant mating engagement. The relatively slack portion 28 of the pulley belt 22 can be left loose, or the slack could be controlled by a lightly tensioned follower roller (not shown) that inhibits the jumping of the toothed pulley belt over the second 24 and third 32 pulley wheels.

In the embodiment of FIG. 2, the rotary actuator is bi-directional, and so the first pulley wheel 18 can rotate in either direction, as shown by arrow 20. Further, an adjustable pulley belt 22 tensioning roller 186 is provided to enable the tension 26 in the pulley belt 22 to be adjusted. Further, the centre of the pulley wheel 18 is also adjustable 187 to effect adjustment of the tension 26 of the pulley belt 22. It will be appreciated, however that the additional adjustability provided by the tensioning roller 186 or the pulley wheel 18 adjuster 187 could be omitted.

Figure 3:
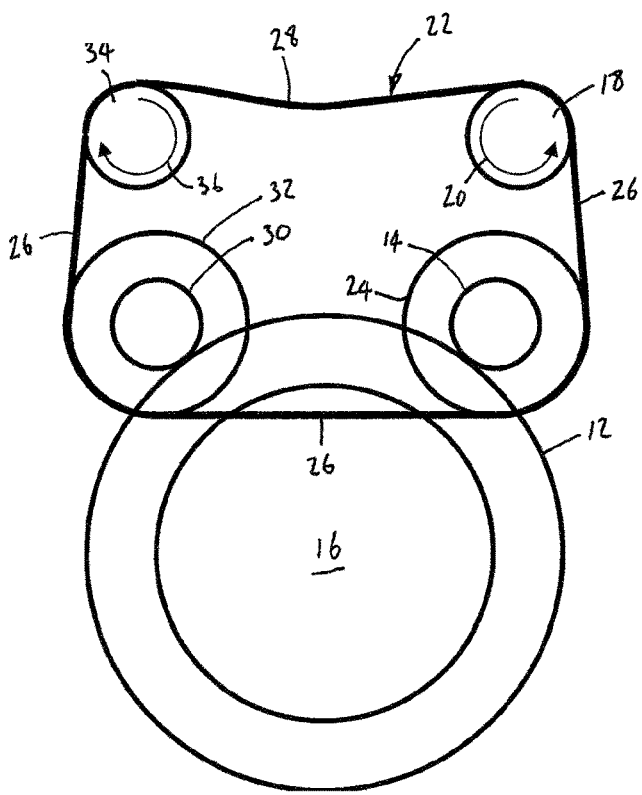
FIG. 3 is a schematic diagram of a third embodiment of a drive assembly in accordance with the invention.
Figure 5:
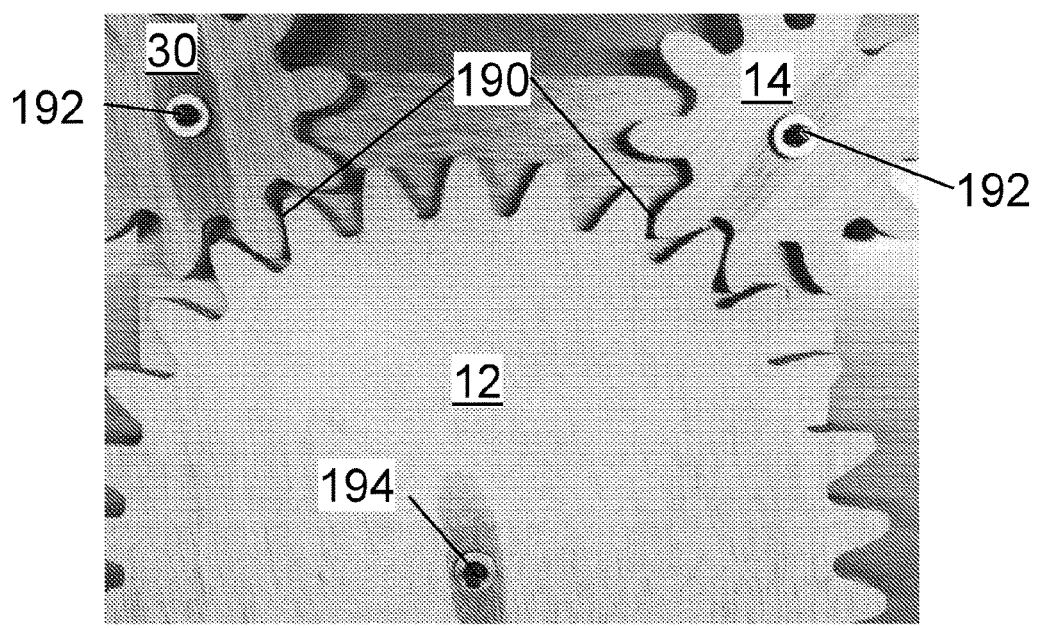
FIG. 5 shows a known gear driven gear meshing with a pair of driving gears.

Another embodiment of the drive assembly of the invention is shown in FIG. 3, which comprises all of the features previously described, and so identical reference signs have been used to identify identical features to avoid repetition.

In the embodiment of FIG. 3, two rotary actuators (not shown) are used for driving the assembly 10, and so and additional toothed pulley wheel 34 has been added, which is operatively connected to the output of the second rotary actuator (not shown). In this example, the rotary actuators are unidirectional, and are arranged to drive the assembly 10 in opposite directions, as shown by arrows 20 and 36. In this case, the pulley belt 22 extends around all four pulley wheels 18, 24, 32, 34 and comprises three tensioned portions 26 between: the first 18 and second 24 pulley wheels; between the second 24 and third 32 pulley wheels; and between the third 32 and fourth 34 pulley wheels. The slack portion 28 is located between the first 18 and fourth 34 pulley wheels. The tensioned portions 26 of the pulley belt 22, in particular, the tensioned portions 26 between the first 18 and second 24 pulley wheels, and between the third 32 and fourth 34 pulley wheels, urges the teeth (not shown) of the driving 14, 30 gears into constant contact with the teeth (not shown) of the annular driven gear 12. Such an arrangement reduces backlash, and allows the drive assembly 10 to benefit from the advantages of unidirectional motors/gearboxes (not shown), which are considerably cheaper, less complicated, lower drag etc. than bidirectional gearboxes.

Figure 4:
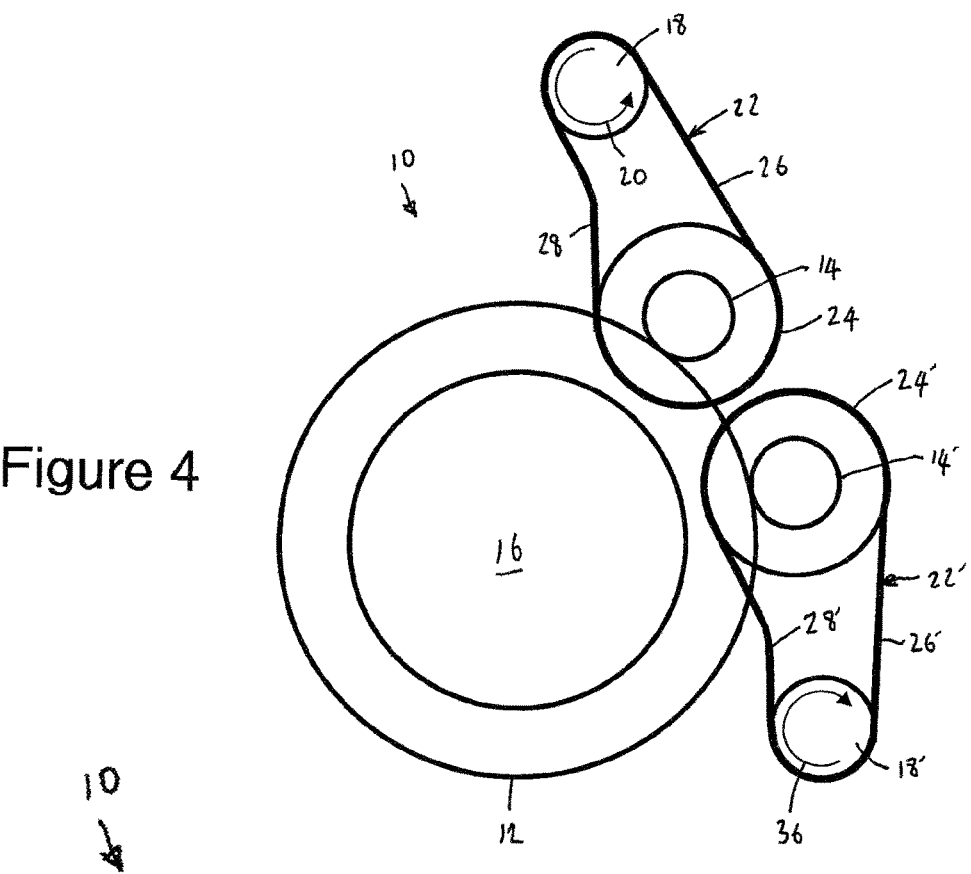
FIG. 4 is a schematic diagram of a fourth embodiment of a drive assembly in accordance with the invention.

FIG. 4 shows a yet further embodiment of the drive assembly of the invention, which comprises all of the features previously described, and so identical reference signs have been used to identify identical features to avoid repetition.

In FIG. 4, two unidirectional drive arrangements, similar to that shown in FIG. 1 have been used to drive the driven gear 12 in both directions. In this embodiment, there are two rotary actuators (not shown) arranged to drive the driven gear in opposite directions, as shown by arrows 20 and 36, and two pulley arrangements, each comprising a pulley belt 22, a driving pulley wheel 18 and a driven pulley wheel 24 coaxially and rigidly connected to a driving gear 14 that meshes with the annular driven gear 12. Each pulley belt 22 has a tensioned 26 and a slack portion 28, as previously described, and so the driving gears' 14 teeth are maintained in constant contact with the teeth of the driven gear 12, thus reducing backlash and play.

It will be appreciated that the driving gears 14, 30 do not need to be coaxial with or unitary with their respective pulley wheels 24, 32, although this is a simple and thus preferred arrangement. For example, additional gearing may be provided, if desired, between the driving gears 14, 30 and their respective pulley wheels 24, 32 and/or means may be provided for offsetting the gears and pulley wheels, as desired.

Figure 7:
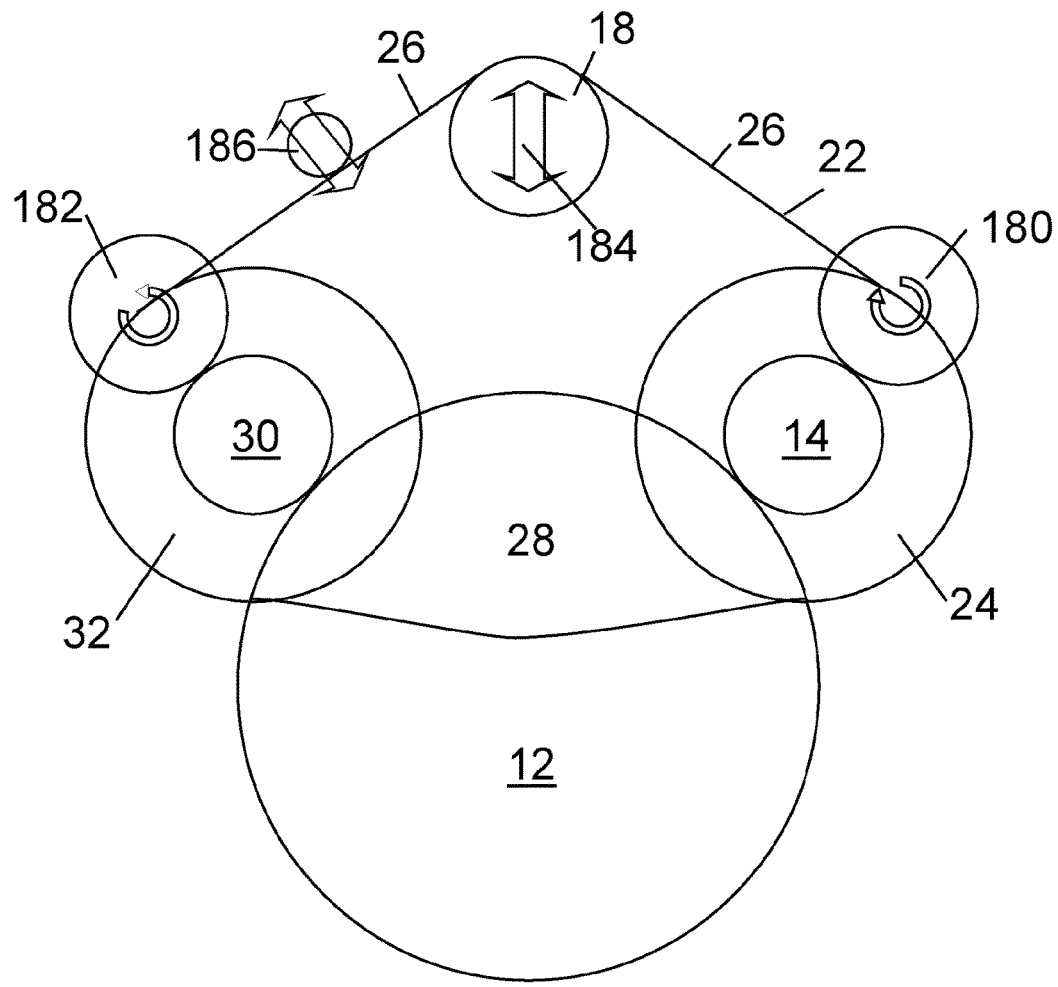
FIG. 7 is a further embodiment of a drive assembly in accordance with the invention with a passive tensioning pulley and a pair of directly driven driving gears.

The embodiment of the geared drive assembly of FIG. 7 shows a yet further configuration in which the driven gear 12 is driven by a pair of driving gears 14, 30 that are independently driven by rotary actuators 180, 182 adapted to drive their respective driving gears 14, 30 in opposite directions. In the embodiment of FIG. 7, the driving gears 14, 30 ar driven by the rotary actuators 180, 182 via additional gearing, although it will be appreciated that the driving gears 14, 30 could each be directly connected to the output shafts, say, of a unidirectional motors.

Figure 6:
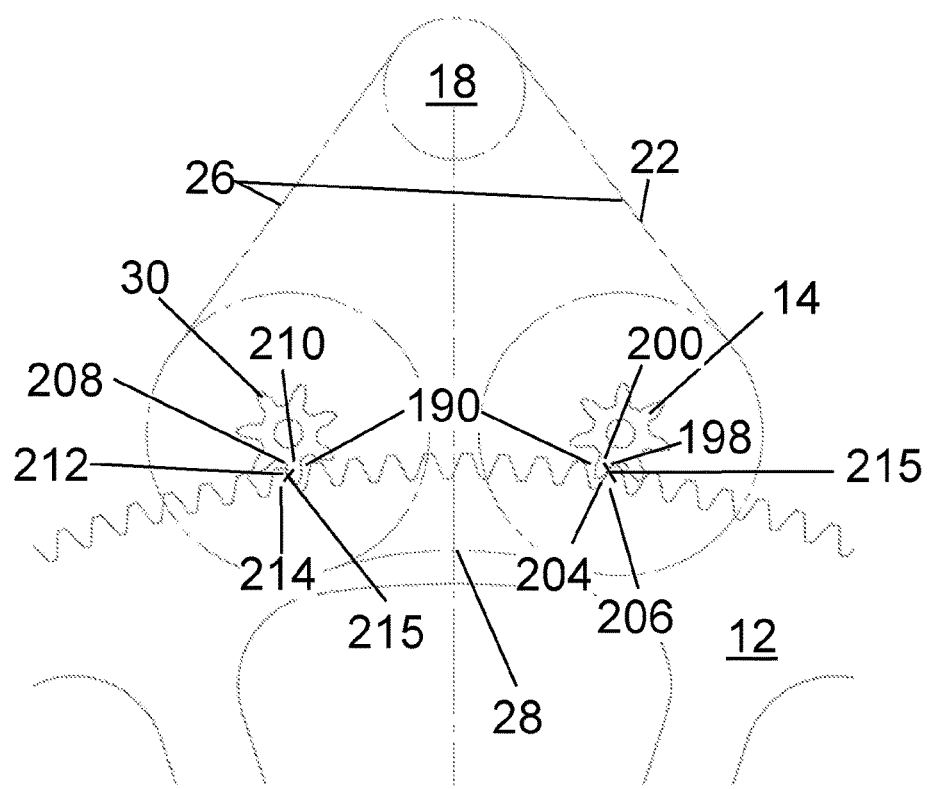
FIG. 6 shows a driven gear meshing with a pair of driven gears biased in accordance with the invention.

In the embodiment of FIG. 7, the pulley belt 22 is passive, that is to say, it does not transmit the driving force for the driving gears 14, 30, but merely serves to bias their respective teeth into engagement with the corresponding teeth of the driven gear 12, for example, as shown in FIG. 6. In FIG. 7, as in all of the foregoing embodiments, the pulley belt 22 extends around a pulley wheel 18 and has a tensioned portion 26 and a slack portion. The tension 26 can be obtained by adjusting 184 the centre of the pulley wheel 18, or using a tensioning roller 186, as shown.

Thus, the arrangement of FIG. 7 allows the driven gear 12 to be driven in opposite directions by the two driving gears 14, 34, which are either directly or indirectly driven by their respective rotary actuators 180, 182, whilst at the same time, the pulley belt 22 maintains driving gears in permanent mating engagement with the driven gear 12 along a preferred or ideal mating line for the gear geometry.

Figure 8:
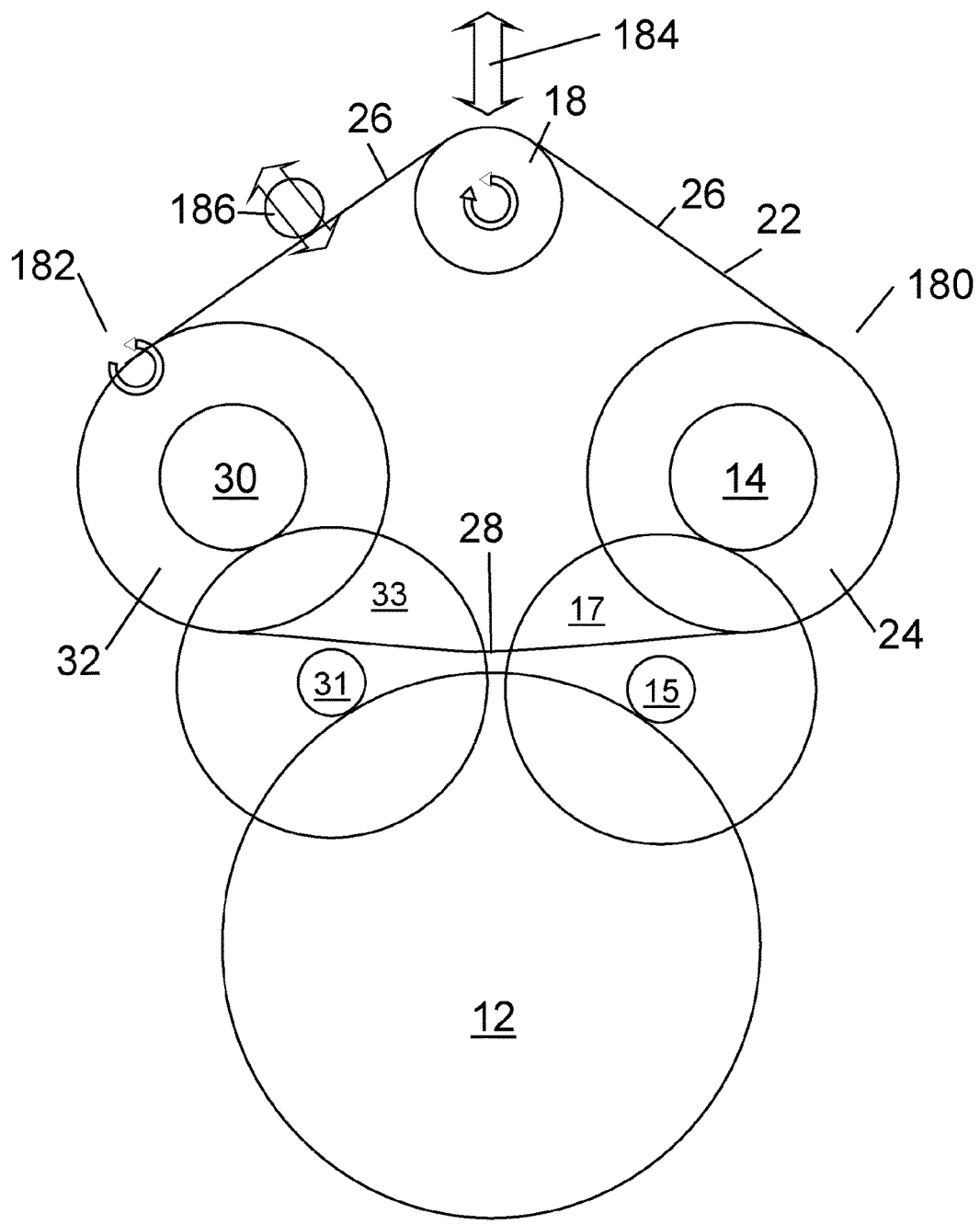
FIG. 8 is a yet further embodiment of a drive assembly in accordance with the invention.

A yet further embodiment of a geared drive assembly in accordance with the invention is shown in FIG. 8, whereby the driving gears 14, 30 are arranged to mesh with secondary driving gears 17, 33, which are rigidly coaxial with a third set of tertiary driving gears 15, 31 that mesh with the driven gear 12. In the embodiment of FIG. 8, the pulley belt 22 comprises a pair of tensioned portions 26 extending between the driving gears 14, 30 and a first pulley wheel 18 that is driven to rotate directly by a bidirectional motor (not shown). The pulley belt 22 serves to bias the teeth of the driving gears 14, 30 into engagement from opposite directions, with the secondary driving gears 17, 33. The biasing force is thus transmitted to the tertiary driving gears 15, 31 which are thus biased into engagement, from opposite directions, with the teeth of the driven gear 12, as previously described. Thus, the biasing force of the pulley belt can be used to enable a single, bi-directional motor drive the driven gear 12 in opposite directions without backlash, in which the driving force is transmitted between the motor and the driven gear 12 via the pulley belt 22 and the driving gears 14, 30, secondary driving gears 17, 33 and the tertiary driving gears 15, 31. Such an arrangement conveniently provides for backlash-free gearing of the motor to the driven gear 12.

The drive assemblies shown herein are merely exemplary embodiments of the invention and it will be readily apparent that the relative sizes and positions of the gears, pulleys and pulley belt could be changed without departing from the scope of the invention.

The invention claimed is:
1. A geared drive assembly, comprising:
a first driving gear;
a driven gear, teeth of the driving gear contacting and meshing with teeth of the driven gear;
a second driving gear that meshes with the driven gear; and a pulley arrangement operatively connected to the driving gear, the pulley arrangement comprising:
  a first pulley wheel;
  a second pulley wheel; and
  a pulley belt, the pulley belt being arranged such that a first part of the pulley belt is tensioned to bias the teeth of the driving gear and the teeth of the driven gear into engagement, and a second part of the pulley belt, different from the first part of the pulley belt, is substantially slack so as not to disengage the teeth of the driving gear and the teeth of the driven gear;
wherein:
  the pulley belt comprises a toothed pulley belt,
  the first pulley wheel and the second pulley wheel each have teeth that are complimentary to teeth of the toothed pulley belt,
  a rotary actuator is operatively connected to the driving gear,
  the toothed pulley belt engaging with the first pulley wheel and the second pulley wheel, which is rigidly and coaxially connected to the driving gear,
  the toothed pulley belt comprises a first pulley belt portion and a second pulley belt portion extending between the first pulley wheel and the second pulley wheel,
  the first pulley belt portion is tensioned,
  the second pulley belt portion is slackened, and
  the first driving gear and the second driving gear are configured to drive the driven gear in opposite directions.

2. The geared drive assembly of claim 1, wherein the first pulley wheel is operatively connected to the rotary actuator and the driving gear is driven by the toothed pulley belt.

3. The geared driving assembly of claim 1, further comprising a single pulley belt interconnecting both the first driving gear and the second driving gear with the first pulley wheel via the second pulley wheel and a third pulley wheel each of which is rigidly and coaxially connected to the driving gear and second driving gear, respectively.

4. The geared drive assembly of claim 3, further comprising a first pulley belt portion extending between the first pulley wheel and the second pulley wheel, the first pulley belt portion being tensioned;
  a second pulley belt portion that is substantially slack; and
  a third pulley belt portion extending between the first pulley wheel and the third pulley wheel, the third pulley belt portion being tensioned.

5. The geared drive assembly of claim 1, wherein the rotary actuator comprises a bi-directional rotary actuator.

6. The geared drive assembly of claim 4, further comprising a second rotary actuator and a fourth pulley wheel of the second rotary actuator,
  wherein the toothed pulley belt encircles the first pulley wheel, the second pulley wheel, the third pulley wheel and the fourth pulley wheel, and
  the toothed pulley belt comprises a first tensioned portion extending between the first pulley wheel and the second pulley wheel, a second tensioned portion extending between the second pulley wheel and the third pulley wheel, a third tensioned portion extending between the third pulley wheel and the fourth pulley wheel and a relatively slack portion extending between the fourth pulley wheel and the first pulley wheel.

7. The geared drive assembly of claim 1, further comprising:
  a second rotary actuator operatively connected to the second driving gear by a second pulley belt engaging with a third pulley wheel, and
  a fourth pulley wheel rigidly and coaxially connected to the second driving gear,
  wherein the second pulley belt comprises a third pulley belt portion and a fourth pulley belt portion extending between the third pulley wheel and the fourth pulley wheel,
  the third pulley belt portion is tensioned, and
  the fourth pulley belt portion is slackened.

8. The geared drive assembly of claim 7, wherein the rotary actuator comprises a unidirectional motor arranged to drive the first driving gear in a direction, the second rotary actuator comprises a unidirectional motor arranged to drive the second driving gear in a direction opposite to the direction of the first driving gear.

9. The geared drive assembly of claim 1, wherein the gears comprise part-helical gears.

10. The geared drive assembly of claim 1, wherein the gears comprise inclined gears.

11. The geared drive assembly of claim 1, wherein the gears comprise cross-axial gears.

12. The geared drive assembly of claim 1, wherein the rotary actuator comprises an electric motor.

13. The geared drive assembly of claim 12, wherein the rotary actuator comprises a stepper motor.

14. The geared drive assembly of claim 1, wherein the rotary actuator comprises a gearbox.

15. The geared drive assembly of claim 1, wherein the first pulley belt portion is tensioned by any one or more of a group comprising: (1) the rotational displacement of one or more of the drive gears relative to the driven gear; (2) relative movement of the first, second and third pulley wheels; and (3) a pulley belt tensioning roller.

16. The geared drive assembly of claim 1, wherein the driven gear comprises an annular gear having a through hole.

17. The geared drive assembly of claim 1, further comprising additional gearing interposed between the first and second driving gears and respective pulley wheels.

18. The geared drive assembly of claim 1, further comprising additional gearing interposed between the first and second driving gears and the driven gear.

19. The geared drive assembly of claim 18 comprising secondary gears arranged to mesh with the driving gears,
  wherein the secondary gears are rigidly and coaxially connected to tertiary driving gears that in turn mesh with the driven gear.

20. A camera mount assembly comprising a motorised mechanism for adjusting an orientation of a camera affixed to the camera mount assembly, the motorised mechanism comprising a geared drive assembly, comprising:
  a first driving gear;
  a driven gear, teeth of the driving gear contacting and meshing with teeth of the driven gear;
  a second driving gear that meshes with the driven gear; and
  a pulley arrangement operatively connected to the driving gear, the pulley arrangement comprising:
    a first pulley wheel;
    a second pulley wheel; and
    a pulley belt, the pulley belt being arranged such that a first part of the pulley belt is tensioned to bias the teeth of the driving gear and the teeth of the driven gear into engagement, and a second part of the pulley belt, different from the first part of the pulley belt, is substantially slack so as not to disengage the teeth of the driving gear and the teeth of the driven gear;

wherein:

the pulley belt comprises a toothed pulley belt, the first pulley wheel and the second pulley wheel each have teeth that are complimentary to teeth of the toothed pulley belt, a rotary actuator is operatively connected to the driving gear, the toothed pulley belt engaging with the first pulley wheel and the second pulley wheel, which is rigidly and coaxially connected to the driving gear, the toothed pulley belt comprises a first pulley belt portion and a second pulley belt portion extending between the first pulley wheel and the second pulley wheel, the first pulley belt portion is tensioned, the second pulley belt portion is slackened, and the first driving gear and the second driving gear are configured to drive the driven gear in opposite directions.

21. The camera mount assembly of claim 20, comprising a pan/tilt head of a camera support.

\* \* \* \* \*